United States Patent

Lamberts et al.

Patent Number: 5,578,651
Date of Patent: Nov. 26, 1996

[54] PROCESS FOR PRODUCING RIGID POLYURETHANE FOAMS

[75] Inventors: Wilhelm Lamberts, Leverkusen; Norbert Eisen, Köln, both of Germany

[73] Assignee: Bayer Aktiengesellschaft, Leverkusen, Germany

[21] Appl. No.: 374,747

[22] PCT Filed: Jul. 22, 1993

[86] PCT No.: PCT/EP93/01957

§ 371 Date: Jan. 27, 1995

§ 102(e) Date: Jan. 27, 1995

[87] PCT Pub. No.: WO94/03532

PCT Pub. Date: Feb. 17, 1994

[30] Foreign Application Priority Data

Aug. 4, 1992 [DE] Germany ............ 42 25 765.4

[51] Int. Cl.⁶ .................................................. C08G 18/00
[52] U.S. Cl. ........................ 521/107; 521/130; 521/131
[58] Field of Search ........................ 521/107, 130, 521/131

[56] References Cited

U.S. PATENT DOCUMENTS

| | | | |
|---|---|---|---|
| 4,568,702 | 2/1986 | Mascioli | 521/112 |
| 4,621,105 | 11/1986 | Statton et al. | 521/107 |
| 4,931,482 | 6/1990 | Lamberts et al. | 521/131 |
| 4,972,002 | 11/1990 | Volkert | 521/120 |
| 5,028,635 | 7/1991 | Nodelman | 521/130 |
| 5,130,345 | 7/1992 | Li et al. | 521/131 |
| 5,137,929 | 8/1992 | Demmin et al. | 521/99 |
| 5,164,418 | 11/1992 | Behme et al. | 521/131 |
| 5,366,662 | 11/1994 | Barthelemy | 521/131 |

*Primary Examiner*—Morton Foelak
*Attorney, Agent, or Firm*—Joseph C. Gil; N. Denise Brown

[57] ABSTRACT

The present invention relates to hard polyurethane foams. These foams are produced by the reaction of 1) polyisocyanates, with 2) compounds having molecular weights of from 92 to 10,000 and having at least two hydrogen atoms which are reactive with isocyanate groups, in the presence of 3) hydrofluoroalkanes as foaming agents, and 4) solubilizers. Suitable solubilizers comprise one or more of a) $R^1-O-CO-O-R^2$;
$R^2-O-CO-O-CO-O-R^2$; or

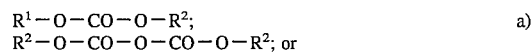

wherein $R^1$ and $R^2$ signify $C_1-C_{12}$-alkyl or together $C_2-C_6$-alkylene and n signifies an integer from 0 to 6;

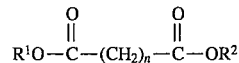

b)

wherein $R^1$ to $R^3$ signify $C_1-C_{12}$-alkyl which is optionally substituted by halogens, $C_5-C_{10}$-cycloalkyl or optionally substituted aryl;

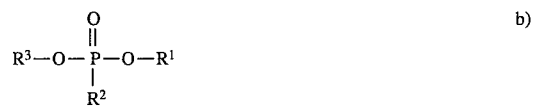

c)

wherein $R^1$ and $R^2$ signify $C_1-C_{16}$-alkyl or $C_5-C_{10}$-cycloalkyl; and/or

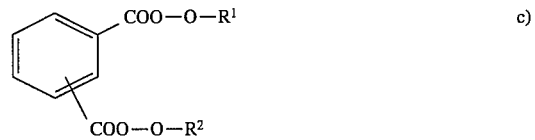 d)

wherein R signifies $C_1-C_{20}$ alkyl or $C_5-C_{10}$ cycloalkyl.

9 Claims, No Drawings

PROCESS FOR PRODUCING RIGID POLYURETHANE FOAMS

Owing to their outstanding heat insulation properties, closed-cell rigid polyurethane foams have been employed for many years for the insulation of appliances for cooling and refrigeration, industrial installations, petrol stations, pipelines, in shipbuilding and for numerous insulating functions in the construction industry.

The thermal conductivity of rigid polyurethane foam, which has to a large extent closed cells, is largely dependent on the type of foaming agent or cell gas used. The perhalogenated chlorofluorocarbons (FCKW) have proved to be particularly suitable for this purpose, especially trichlorofluoromethane (R11), which has a particularly low thermal conductivity. The said materials are chemically inert and consequently non-toxic and non-combustible. Owing to their high stability, however, the perhalogenated chlorofluorocarbons enter the stratosphere, where they are thought to contribute to the breakdown of the ozone present there by reason of their chlorine content (for example, Molina, Rowland Mature 249 (1974) 810; First interim report of the Bundestags-Enquete-Kommission "Vorsorge zum Schutz der Erdatmosphäre" [Bundestag Commission of Enquiry, "Provisions for Protection of the Earth's Atmosphere"] dated Feb. 11, 1988, Deutscher Bundestag, Referat Öffentlichkeitsarbeit, Bonn).

The use of partly fluorinated hydrocarbons (hydrofluoroalkanes) such as 1,1,1,4,4,4-hexafluorobutane instead of the perhalogenated chlorofluorocarbons as foaming agents for plastic foams, including polyurethane foams, has therefore been proposed (cf. EP-PS 344 537, U.S. Pat. No. 4,931,482).

The hydrofluoroalkanes, which retain at least one carbon-hydrogen bond, contain no chlorine atoms and consequently have an ODP value (Ozone Depletion Potential) of zero. (In comparison:R11:ODP=1)

A typical representative of this class of substances apart from 1,1,1,4,4,4-hexafluorobutane (R356) is 1,1,1,2-tetrafluoroethane (R134a).

Owing to their chemical structure, partly fluorinated hydrocarbons are highly non-polar and so do not mix well with the polyols conventionally used for producing rigid foam. However, this is an important prerequisite for the conventional technique of production, wherein the polyol and isocyanate components are mechanically mixed with one another.

In addition to the reactive polyether polyol or polyester polyol, the polyol components also contain the foaming agent and the auxiliary substances such as activators, emulsifiers and stabilisers in dissolved form. The polyol component is thus a one-phase mixture.

In equimolar substitution of conventional foaming agents such as, for example, R11, by the new, environmentally friendly compounds in commercially available formulations, the low solubility of the partly fluorinated hydrocarbons leads to the formation of two phases which cannot be processed further by conventional methods.

The object of the present invention was therefore to increase the solubility in polyols of partly fluorinated hydrocarbons, so that in the equimolar substitution of R11 by the said substances a one-phase polyol component is obtained.

Surprisingly, it has been found that the solubility of partly fluorinated alkanes in the polyol is significantly increased by adding specific solubilisers.

The invention provides a process for producing rigid polyurethane foams by the reaction of
1) polyisocyanates with
2) compounds of a molecular weight of from 92 to 10,000 having at least two hydrogen atoms active towards isocyanates in the presence of
3) hydrofluoroalkanes as foaming agents and of
4) solubilisers as well as optionally in the presence of
5) other auxiliary substances and additives known per se, characterised in that at least one of the following compounds are used as solubilisers (4)

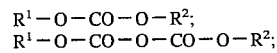
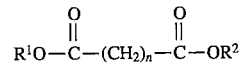

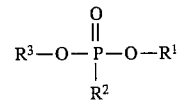

wherein $R^1$ and $R^2$ signify $C_1$–$C_{12}$-alkyl or together $C_2$–$C_6$-alkylene and n signifies an integer from 0 to 6,

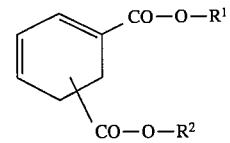

wherein $R^1$ to $R^3$ signify $C_1$–$C_{12}$-alkyl which is optionally substituted by halogens, $C_5$–$C_{10}$-cycloalkyl or optionally substituted aryl,

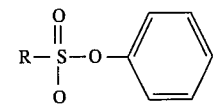

wherein $R^1$ and $R^2$ signify $C_1$–$C_{16}$-alkyl or $C_5$–$C_{10}$-cycloalkyl,

wherein R signifies $C_1$–$C_{20}$-alkyl or $C_5$–$C_{10}$-cycloalkyl.

The starting components used for the production of the rigid polyurethane foams are:
1. Aliphatic, cycloaliphatic, araliphatic, aromatic and heterocyclic polyisocyanates which are described, for example, by W. Siefken in Justus Liebigs Annalen der Chemie, 562, pages 75 to 136, for example those of the formula Q(NCO)n, wherein
   n signifies 2 to 4, preferably 2, and
   Q is an aliphatic hydrocarbon radical having 2 to 18, preferably 6 to 10 C atoms, a cycloaliphatic hydrocarbon radical having 4 to 15, preferably 5 to 10 C atoms, an aromatic hydrocarbon radical having 6 to 15, preferably 6 to 13 C atoms or an araliphatic hydrocarbon radical having 8 to 15, preferably 8 to 13 C atoms, for example, polyisocyanates such as are described in DE-OS 2 832 253, pages 10 to 11.

As a rule the technically readily accessible polyisocyanates are particularly preferred, for example, 2,4- and 2,6-tolylene diisocyanate and any mixtures of the said isomers ("TDI"), polyphenyl polymethylene polyisocyanates, which are prepared by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/ or 2,6-tolylene diisocyanate or from 4,4'- and/or 2,4'-diphenylmethane diisocyanate.

2. Other starting materials are compounds having at least two hydrogen atoms reactive towards isocyanates and a molecular weight as a rule of from 92 to 10,000. These are understood to include, apart from compounds containing amino groups, thiol groups or carboxyl groups, preferably compounds containing hydroxyl groups, particularly compounds containing from 2 to 8 hydroxyl groups, especially those of a molecular weight of from 200 to 1200, preferably 250 to 500, for example, such polyethers and polyesters having at least 2, as a rule 2 to 8, preferably 2 to 6 hydroxyl groups, which are known per se in the production of homogeneous and cellular polyurethanes and which are described, for example, in DE-OS 2 832 253, pages 11 to 18.

3. Volatile partly fluorinated hydrocarbons (hydrofluoroalkanes) are employed as foaming agents, preferably 1,1,1,4,4,4-hexafluorobutane (R356), 1,1,1,2-tetrafluoroethane (R134a) and/or 1,1,1,2,3,3,3-heptafluoropropane (R227).

Optionally water and/or other volatile organic substances are used in proportion concomitantly as foaming agents.

4. According to the invention the aforementioned solubilisers are used, preferably in quantities of from 1 to 10 parts by weight, particularly from 3 to 5 parts by weight, per 100 parts by weight of component 2).

Preferred compounds are propylene carbonate, triethyl phosphate, tributyl phosphate and dioctyl phthalate.

5. Optionally other auxiliary substances and additives known per se are used concomitantly, such as flameproofing agents, catalysts and foam stabilisers.

Flameproofing agents known per se, preferably products which are liquid at 20° C., are employed as flame-proofing agents.

Polyether siloxanes, especially water-soluble representatives, are mainly suitable as foam stabilisers. The said compounds are generally structured in such a way that a copolymer of ethylene oxide and propylene oxide is bonded with a polydimethylsiloxane radical. Such foam stabilisers are described, for example, in U.S. Pat. Nos. 2,834,748, 2,917,480 and 3,629,308. The catalysts known per se from polyurethane chemistry, such as tertiary amine and/or organometallic compounds, are suitable as catalysts.

Reaction retarding agents, for example, acid reacting substances such as hydrochloric acid or organic acid halides, also cell regulators of a type known per se, such as paraffins or fatty alcohols or dimethylpolysiloxanes, as well as pigments or dyes, also stabilisers against the influences of ageing and weathering, softeners and fungistatic and bacteriostatic substances as well as fillers such as barium sulphate, siliceous earth carbon black or whitening, may also be used concomitantly.

Further examples of surface-active additives and foam stabilisers, cell regulators, reaction retarding agents, stabilisers, flame retardants, softeners, dyes and fillers as well as fungistatic and bacteriostatic substances, to be used concomitantly optionally according to the invention, together with particulars concerning the method of application and mechanism of action of the said additives, are described in Kunststoff-Handbuch, Volume VII, published by Vieweg and Höchtlen, Carl-Hanser-Verlag, Munich 1966, for example, on pages 103 to 113.

Carrying out of the process according to the invention:

The reaction components are reacted according to the invention by the known per se one-step process, prepolymer process or semiprepolymer process, with mechanical equipment frequently being employed, for example, that described in U.S. Pat. No. 2,764,565. Particulars of processing equipment which is also suitable according to the invention are given in Kunststoff-Handbuch, Volume VIII, published by Vieweg and Höchtlen, Carl-Hanser-Verlag, Munich 1966, for example, on pages 121 to 205.

According to the invention the process is carried out within the characteristic range of from 100 to 300, preferably 100 to 130.

In the course of the foam production, according to the invention foaming may also be carried out in closed moulds. In this case the reaction mixture is placed into a mould. Suitable mould materials are metals, for example, aluminium, or plastics, for example, epoxy resin.

The foamable reaction mixture expands in the mould and forms the composite. The foaming in the mould may be carried out so that the surface of the moulded product has a cellular structure. However, it may also be carried out so that the moulded product has a solid skin and a cellular core. According to the invention, in this connection it is possible to proceed so that the quantity of foamable reaction mixture placed in the mould is such that the foam developed just fills the mould. It is also possible to operate so that more of the foamable reaction mixture is placed into the mould than is required to fill the interior of the mould with foam. In the latter case the operation is thus carried out with "overcharging"; such a method of procedure is known, for example, from U.S. Pat. No. 3,178,490 and 3,182,104.

"External foaming agents" known per se, such as silicone oils, are very often used for foaming in the mould. However, so-called "internal foaming agents", optionally mixed with external foaming agents, can also be used; these are disclosed, for example, in DE-OS 2 121 670 and 2 307 589.

The process according to the invention is employed preferably for the foaming of cooling and refrigerating equipment.

However, foams can, of course, also be produced by block foaming or according to the known per se twin conveyor belt process.

The rigid foams which can be obtained according to the invention are used, for example, in the building trade and for the insulation of long distance pipes and of containers.

EXAMPLES 1,1,1,4,4,4,-hexafluorobutane is added to 100 g of a polyol mixture consisting of basic polyol, activator, stabiliser and water until a phase separation is detected. This quantity is designated as the limiting concentration for the solubility in the respective polyol mixture.

The polyol mixtures in the examples each consist of 95 g of basic polyol, 1 g of activator (dimethylcyclohexylamine), 2 g of stabiliser B 8421 (Goldschmidt AG) and 2 g of water. In addition 5 g of the emulsifiers according to the invention are introduced.

Polyol 1: Polyol based on sucrose, propylene glycol, water and propylene oxide having an average molecular weight of 850 g/mol Polyol 2: Polyol based on sorbitol, propylene glycol and propylene oxide having an average molecular weight of 750 g/mol Polyol 3: Polyol based on ethylenediamine and propylene oxide having an average molecular weight of 480 g/mol Polyol 4: Polyol based on triethanolamine and propylene oxide having an average molecular weight of 1,100 g/mol The emulsifiers are 1: propylene carbonate 2: triethyl phosphate 3: dioctyl phthalate 4: tributyl phosphate Solubility of 1,1,1,4,4,4 -hexafluorobutane [g]

|  | Comparison without | Example 1 with emulsifier 1 | Example 2 with emulsifier 2 | Example 3 with emulsifier 3 | Example 4 with emulsifier 4 |
| --- | --- | --- | --- | --- | --- |
| Polyol 1 | 11 | 14 | 14 | 13 | 14 |
| Polyol 2 | 9 | 14 | 12 | 11 | 11 |
| Polyol 3 | 29 | 36 | 38 | 34 | 38 |
| Polyol 4 | 27 | 33 | 32 | 34 | 34 |

The Examples 1 to 4 according to the invention show quite clearly that the quantities of 1,1,1,4,4,4-hexafluorobutane soluble in the polyol could be significantly increased as compared with the comparison Example.

The higher the quantities of foaming agent soluble in the polyol, the higher is the proportion of the foaming agent in the cell gas of the rigid foam produced therefrom and at the same time the smaller is the thermal conductivity.

We claim:

1. Process for producing rigid polyurethane foams by the reaction of
   1) polyisocyanates with
   2) compounds of a molecular weight of from 92 to 10,000 having at least two hydrogen atoms active towards isocyanates in the presence of
   3) hydrofluoroalkanes as foaming agents and of
   4) solubilisers as well as optionally in the presence of
   5) other auxiliary substances and additives known per se, characterised in that at least one of the following compounds are used as solubilisers (4)

$$R^1-O-CO-O-R^2;$$
$$R^1-O-CO-O-CO-O-R^2;$$

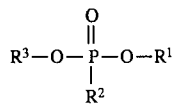

wherein $R^1$ and $R^2$ signify $C_1$–$C_{12}$-alkyl or together $C_2$–$C_6$-alkylene and n signifies an integer from 0 to 6,

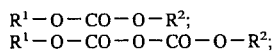

wherein $R^1$ to $R^3$ signify $C_1$–$C_{12}$-alkyl which is optionally substituted by halogens, $C_5$–$C_{10}$-cycloalkyl or optionally substituted aryl,

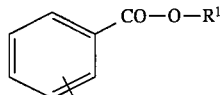

wherein $R^1$ and $R^2$ signify $C_1$–$C_{16}$-alkyl or $C_5$–$C_{10}$-cycloalkyl,

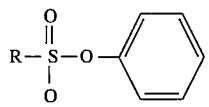

wherein R signifies $C_1$–$C_{20}$ alkyl or $C_5$–$C_{10}$ cycloalkyl.

2. Process according to claim 1, characterised in that propylene carbonate is used as a solubiliser.

3. Process according to claim 1, characterised in that triethyl phosphate is used as a solubiliser.

4. Process according to claim 1, characterised in that tributyl phosphate is used as a solubiliser.

5. Process according to claim 1, characterised in that dioctyl phthalate is used as a solubiliser.

6. Process according to claim 1, characterised in that the solubilisers are used in quantities of from 1 to 10 parts by weight per 100 parts by weight of component 2).

7. Process according to claim 1, characterised in that 1,1,1,4,4,4-hexafluorobutane is used as a foaming agent.

8. Process according to claim 1, characterised in that 1,1,1,2-tetrafluoroethane is used as a foaming agent.

9. Process according to claim 1, characterised in that 1,1,1,2,3,3,3-heptafluoropropane is used as a foaming agent.

* * * * *